United States Patent
Kapuria et al.

(10) Patent No.: US 10,926,699 B2
(45) Date of Patent: Feb. 23, 2021

(54) METHOD AND SYSTEM FOR HISTORICAL STATE BASED ADVANCED DRIVER ASSISTANCE

(71) Applicant: THE HI-TECH ROBOTIC SYSTEMZ LTD, Haryana (IN)

(72) Inventors: Anuj Kapuria, Haryana (IN); Ritukar Vijay, Haryana (IN)

(73) Assignee: THE HI-TECH ROBOTIC SYSTEMZ LTD, Gurugram (IN)

(*) Notice: Subject to any disclaimer, the term of this patent is extended or adjusted under 35 U.S.C. 154(b) by 42 days.

(21) Appl. No.: 15/597,970

(22) Filed: May 17, 2017

(65) Prior Publication Data
US 2018/0257561 A1 Sep. 13, 2018

(30) Foreign Application Priority Data
Mar. 10, 2017 (IN) .............................. 201711008492

(51) Int. Cl.
| | |
|---|---|
| B60Q 9/00 | (2006.01) |
| G01S 17/08 | (2006.01) |
| H04N 5/247 | (2006.01) |
| H04N 5/372 | (2011.01) |
| G01S 17/93 | (2020.01) |
| G01S 17/02 | (2020.01) |
| G06K 9/00 | (2006.01) |
| B60W 50/14 | (2020.01) |
| B60W 50/08 | (2020.01) |
| G01S 17/86 | (2020.01) |

(Continued)

(52) U.S. Cl.
CPC ............. *B60Q 9/00* (2013.01); *B60W 50/085* (2013.01); *B60W 50/14* (2013.01); *G01S 17/08* (2013.01); *G01S 17/86* (2020.01); *G01S 17/931* (2020.01); *G06K 9/00845* (2013.01); *H04N 5/247* (2013.01); *H04N 5/372* (2013.01); *H04N 13/204* (2018.05); *B60W 50/0098* (2013.01); *B60W 50/16* (2013.01); *B60W 2050/0088* (2013.01); *B60W 2050/0089* (2013.01); *B60W 2050/143* (2013.01); *B60W 2050/146* (2013.01); *B60W 2420/42* (2013.01)

(58) Field of Classification Search
None
See application file for complete search history.

(56) References Cited

U.S. PATENT DOCUMENTS

| | | | |
|---|---|---|---|
| 2014/0207811 A1* | 7/2014 | Kim | H04N 21/44204 |
| | | | 707/758 |
| 2015/0345981 A1* | 12/2015 | Goldman-Shenhar | ........................ |
| | | | G01C 21/3629 |
| | | | 701/533 |

(Continued)

*Primary Examiner* — Edemio Navas, Jr.

(57) ABSTRACT

The present invention provides a method and system of historical emotion based driver advanced assistance. In this method, a combination of external environment to a vehicle on which the advanced driver assistance system (ADAS) is mounted fetched by forward looking cameras is combined with rear looking camera for internal environment or driver state, is generated. The generated combination is utilized to analyze is there is any critical situation that is upcoming. For providing feedback for such situation, the ADAS fetches a historical combination situation similar to the current situation combination. The intensity of the feedback is varied as per the driver reaction to the feedback provided to the driver at such historical combination situation.

11 Claims, 8 Drawing Sheets

| Driver Reaction | Driver Emotion Category | Feedback Modification required | Type of modification |
|---|---|---|---|
| Fast | Neutral | No | NA |
| | Positive | Yes | Low decrease in feedback intensity |
| | Negative | Yes | High decrease in feedback intensity |
| Medium | Neutral | Yes | Low increase in feedback intensity |
| | Positive | Yes | Medium increase in feedback intensity |
| | Negative | Yes | Medium decrease in feedback intensity |
| Slow | Neutral | Yes | Medium increase in feedback intensity |
| | Positive | Yes | High increase in feedback intensity |
| | Negative | Yes | Low increase in feedback intensity |

(51) Int. Cl.
*G01S 17/931* (2020.01)
*H04N 13/204* (2018.01)
*B60W 50/00* (2006.01)
*B60W 50/16* (2020.01)

(56) References Cited

U.S. PATENT DOCUMENTS

| | | | |
|---|---|---|---|
| 2016/0050356 A1* | 2/2016 | Nalepka | H04N 5/23203 348/148 |
| 2017/0091872 A1* | 3/2017 | Okumura | G08G 1/0129 |
| 2017/0190337 A1* | 7/2017 | Singh | B60W 50/14 |
| 2017/0364082 A1* | 12/2017 | Taieb | G01C 21/32 |
| 2018/0174457 A1* | 6/2018 | Taylor | B60W 40/09 |

* cited by examiner

| Driver Reaction | Driver Emotion Category | Feedback Modification required | Type of modification |
|---|---|---|---|
| Fast | Neutral | No | NA |
| | Positive | Yes | Low decrease in feedback intensity |
| | Negative | Yes | High decrease in feedback intensity |
| Medium | Neutral | Yes | Low increase in feedback intensity |
| | Positive | Yes | Medium increase in feedback intensity |
| | Negative | Yes | Medium decrease in feedback intensity |
| Slow | Neutral | Yes | Medium increase in feedback intensity |
| | Positive | Yes | High increase in feedback intensity |
| | Negative | Yes | Low increase in feedback intensity |

METHOD AND SYSTEM FOR HISTORICAL STATE BASED ADVANCED DRIVER ASSISTANCE

TECHNICAL FIELD

This invention relates to an advanced driver assistance system (ADAS) and more particularly to an ADAS utilizing historical driver reaction to vary degree of feedback to be given to user in real-time.

BACKGROUND OF THE INVENTION

Driver assistance systems are being widely used these days in vehicles. These systems help a driver to be attentive to the road by providing various kinds of information to the driver of the vehicle. Typically, such systems are in-built to the vehicle and vary from vehicle to vehicle. There are various ways in which the driver assistance systems help driver of the vehicle. In one such way, the driver assistance systems are equipped with front looking cameras that identify approaching situations. Then, a corrective action is taken in such situation.

Another type of driver assistance systems utilizes a driver state monitoring camera in addition to the forward-looking cameras. Data from both the modules is fused together and a warning is provided based on predictive danger due to a current situation. However, there is no measure of how the warning is provided and to what degree the warning should be applied.

Therefore, there exists the need for a better driver assistance system.

SUMMARY OF THE INVENTION

The present invention comprises a driver assistance device having one or more of the features recited in the appended claims and/or one or more of the following features, which alone or in any combination may comprise patentable subject matter:

The objective of the invention is to provide an advanced driver assistance system (ADAS) with historical driver reaction retrieval and analysis.

Accordingly, in an embodiment of the invention, there is provided an advanced driver assistance system (ADAS) mounted on a vehicle, wherein the system comprises a forward-looking first camera, that is adapted to identify activity and objects in short-range vicinity of the vehicle. The system further includes a forward looking second camera, adapted to identify activity and objects in long-range vicinity of the vehicle. The system also includes a ranging module, adapted to measure distance objects in a straight path in-front of the vehicle. The system, further includes, a rear-looking third camera, that monitors driver state. Furthermore, the system includes a storage, that is configured to store driver's profile, various external environment conditions and driver reaction to various driving situations. The system also includes a processor, configured to receive inputs from the first camera, the second camera, the ranging module, the third camera and the storage. Processor is also configured to provide a feedback to the driver for a real-time situation wherein the intensity of the feedback provided is varied based on the historical reaction of the driver to a feedback to a historical situation similar to the real-time situation.

According to another aspect of the invention, there is provided a method for real-time driver assistance. The method includes gathering of external environment through a plurality of forward looking cameras connected to a processor; the method further includes capturing current driver state information through at least one rear looking camera, connected to the processor; generating, by the processor a combination of the current external environment and the current driver state information; fetching, by the processor, a historical combination similar to the combination generated by the processor from a storage module, wherein the storage module is configured to store a plurality of historical combinations of external environment and corresponding driver state data and a corresponding driver reaction to a feedback offered to the driver for a particular combination of external environment and driver state during the particular combination; and varying, by the processor, intensity of a feedback to be provided to the driver wherein the variation is based on the similar historical combination and the corresponding driver reaction.

Additional features and advantages are realized through the techniques of the present disclosure. Other embodiments and aspects of the present disclosure are described in detail herein and are considered a part of the present disclosure. For a better understanding of the present disclosure with advantages and features, refer to the description and to the drawings.

BRIEF DESCRIPTION OF THE ACCOMPANYING DRAWINGS

The foregoing summary, as well as the following detailed description of various embodiments, is better understood when read in conjunction with the drawings provided herein. For the purpose of illustration, there is shown in the drawings exemplary embodiments; however, the presently disclosed subject matter is not limited to the specific methods and instrumentalities disclosed.

DETAILED DESCRIPTION OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed these terms by workers in the art.

Hereinafter, preferred embodiments of the invention will be described in detail in reference to the accompanying drawings. It should be understood that like reference numbers are used to indicate like elements even in different drawings. Detailed descriptions of known functions and configurations that may unnecessarily obscure the aspect of the invention have been omitted.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
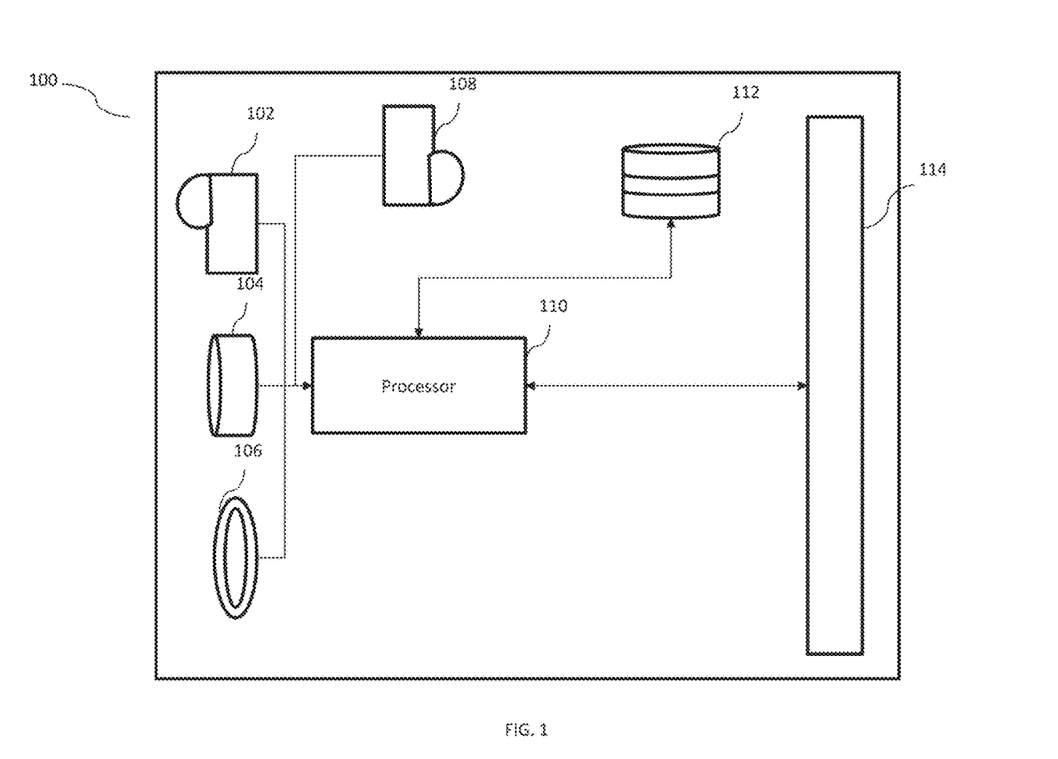
FIG. 1 is a block diagram illustrating an advanced driver assistance system, in accordance with an embodiment of the invention.

Referring now to FIG. 1, illustrates a block diagram illustrating an advanced driver assistance system (ADAS) 100. The system 100 is vehicle mounted. In an embodiment of the invention, the system 100 is windshield mounted or mounted on "A" pillar of the vehicle. Furthermore, in another embodiment of the invention the system 100 can be a single casing device that will be explained in detail in conjunction with FIGS. 3a and 3b. The system 100 includes a forward looking first camera 102. The forward-looking first camera 102, in an embodiment of the invention, can be a twin lens stereo camera. The first camera 102 is adapted to identify activity and objects that are within the close-range vicinity of the vehicle on which it is mounted.

System 100 further includes, a forward-looking second camera 104. The second camera 104 is a long range narrow field camera that identifies activity and objects in long-range vicinity of the vehicle on which system 100 has been mounted. Furthermore, the system 100, includes a ranging module 106. The ranging module 106 identifies and determines distance of objects lying in front of the vehicle. The ranging module 106, in an embodiment of the invention, is a Light Detection and Ranging (LIDAR) module based on LIDAR method. As already known in the art, LIDAR is a device distance to a target by illuminating that target with a laser light. For this purpose, LIDAR includes a transmitter to transmit laser light and a receiver to receive the reflected laser light.

Still referring to FIG. 1, the system 100 includes a rear-looking third camera 108. The third camera 108 helps in identifying driver profile and monitor driver's state. Third camera 108 can identify the driver whether it's an old person, a woman, a young boy, etc. Also, the camera 108 has ability to identify various kinds of reactions of the driver. Whether the driver is happy, angry, sad, worried, tensed etc. The camera 108 is also equipped with features to identify whether driver is attentive or not, is the driver sleepy, or looking at phone etc. Hence, the third camera 108 is equipped to monitor driver state.

System 100, further includes a processor 110, to which are connected the first camera 102, the second camera 104, the ranging module 106 and the third camera 108. Processor 110, takes inputs from all the three cameras and processes the information thus gathered. The information gathered from first camera 102, the second camera 104 and the ranging module 106 provides external environment information of the vehicle on which the system 100 is mounted. The processor 110, also takes input from the third camera 108 that gives the processor 110 information about the driver state and driver's profile. The processor 110 categorizes information into external and driver state information. Then a combination of the two is made and stored in a memory 112. Memory 112, stores multiple historical combination situations and along with that, the memory 112 also includes corresponding feedback of the system 100 to the driver in such situations and driver's reaction to such feedback to the driver (to be explained in detail later in description). The memory 112 can either be a local or a remote memory. Hence, the processor 110 is either connected through wired connection or through wireless communication protocol to the memory 112.

Still referring to FIG. 1, the processor 110, after analyzing current external environment input and current driver state, identifies a threat based on the combination of current information or even based on individual information. Hence, the processor 110 queries the memory 112 to find such a combination and the corresponding feedback given to the driver and the driver reaction after the feedback was provided to the driver. Hence, based on the feedback given and the driver reaction to the historical combination of information, a decision is taken by the processor 110. The decision of the processor 110, decides whether to keep the intensity of the feedback same as previous, decrease, or increase the intensity of the feedback and forward the decision to a feedback module 114 of the vehicle. Feedback module can either give a visual warning to the driver, a haptic warning or an audio warning to the driver.

Figure 2:
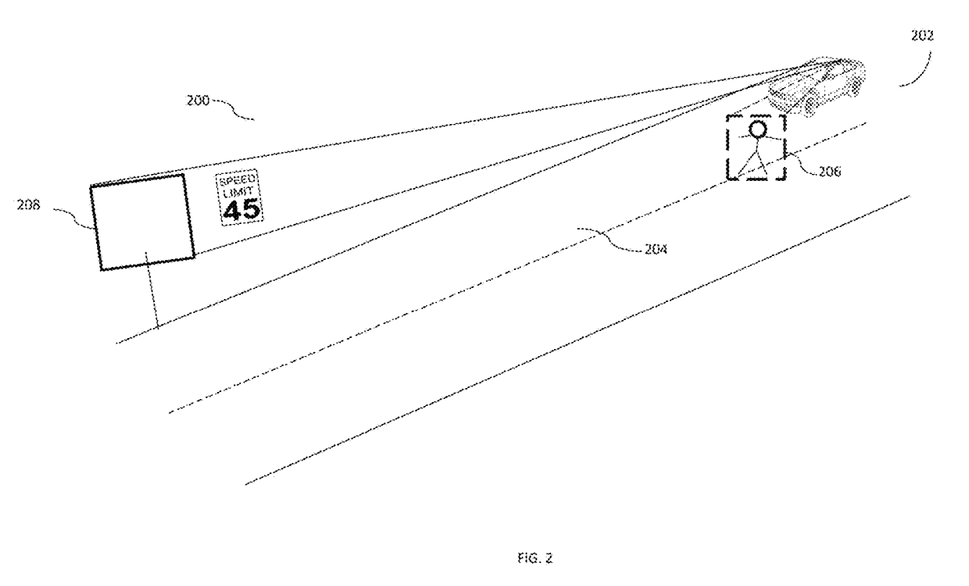
FIG. 2 is a line diagram illustrating an environment for functioning of the driver assistance system, in accordance with an embodiment of the invention.

Now referring to FIG. 2, a line illustrating an environment 200 where present invention is expected to work, in accordance with an embodiment of the invention. The environment 200 includes a road 204 on which is being driven a vehicle 202, wherein the vehicle 202 includes the first camera 102, the second camera 104 and the ranging module 106 mounted within the vehicle 202, preferably on windshield of the vehicle 202. There is also mounted the third camera 108 that is rear-looking and monitors driver state.

The first camera 102, is adapted to capture activity or objects like pedestrian 206 on the road 204 that is in close range vicinity. The first camera 102 does this in real-time. However, it is to be appreciated that the first camera 102 works in low speed ranges like 0-120 mph. The second camera 104, is adapted to capture objects or activity in long-range vicinity of the vehicle 202 like a speed sign 208 as shown in the environment 200. Also, the ranging module 106, determines distance to the speed sign 208 in real-time and time to warn the driver of the vehicle 202 is calculated. The warning to the driver is effected using a feedback module (not shown in figure). The feedback module takes inputs from a processor (to be explained in detail in conjunction with FIG. 4) and provides feedback to the driver. Feedback can be an audio warning, a visual warning, an audio-visual warning, a haptic feedback like vibration etc.

Figure 3A:
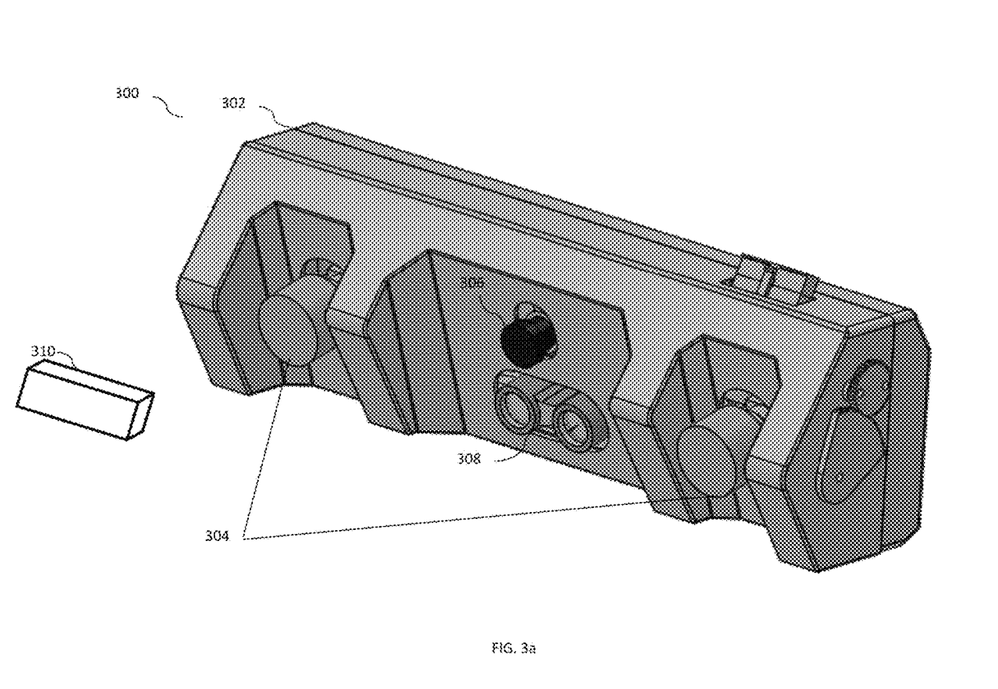
FIG. 3a is a line diagram illustrating front view of an advanced driver assistance system, in accordance with an embodiment of the invention.

Now referring to FIG. 3a, a line diagram illustrating front view of an advanced driver assistance system (ADAS) 300, in accordance with an embodiment of the invention. The ADAS 300 includes a single housing unit 302. In an embodiment of the invention, the single housing unit 302 is made up of anyone or a combination of a plastic, a fiber, a metal, etc. Single housing unit 302 houses a plurality of camera modules. The camera modules include a first camera 304 that is, in an embodiment, a stereo camera and hence is a twin lens camera adapted to capture activity and identify objects in close-range vicinity of the vehicle. The first camera 304 is adapted to function efficiently in low speed ranges of the vehicle that is in a range of 1-20 mph. Further, the ADAS 300 includes a second camera 306. The second camera 306 can be a long-range, narrow field camera adapted to identify activity and objects in long-range vicinity of the vehicle. The second camera 306 functions efficiently at higher speed that is in speed more than 20 mph.

Still referring to FIG. 3a, the ADAS 300 further includes a ranging module 308. The ranging module 308 is a Light and Detection Ranging (LIDAR) module. The ranging module 308 determines distance to the objects in front of the vehicle to which ADAS 300 is mounted. For this, the ranging module includes a laser emitter and a laser receiver. The emitter, emits laser waves which when reflects from the object is received by the receiver and hence calculates the distance to that object. In this way, the ranging module keeps in check what all objects are in-front and what is a safe distance from such objects. The ADAS 300 may have a control unit 310 that may be placed on dashboard of the vehicle whereas ADAS 300 might be mounted on windshield of the vehicle. All data is although captured by ADAS 300 however, processing might take place within the control unit 310 that might also control feedback input to the driver.

Figure 3B:
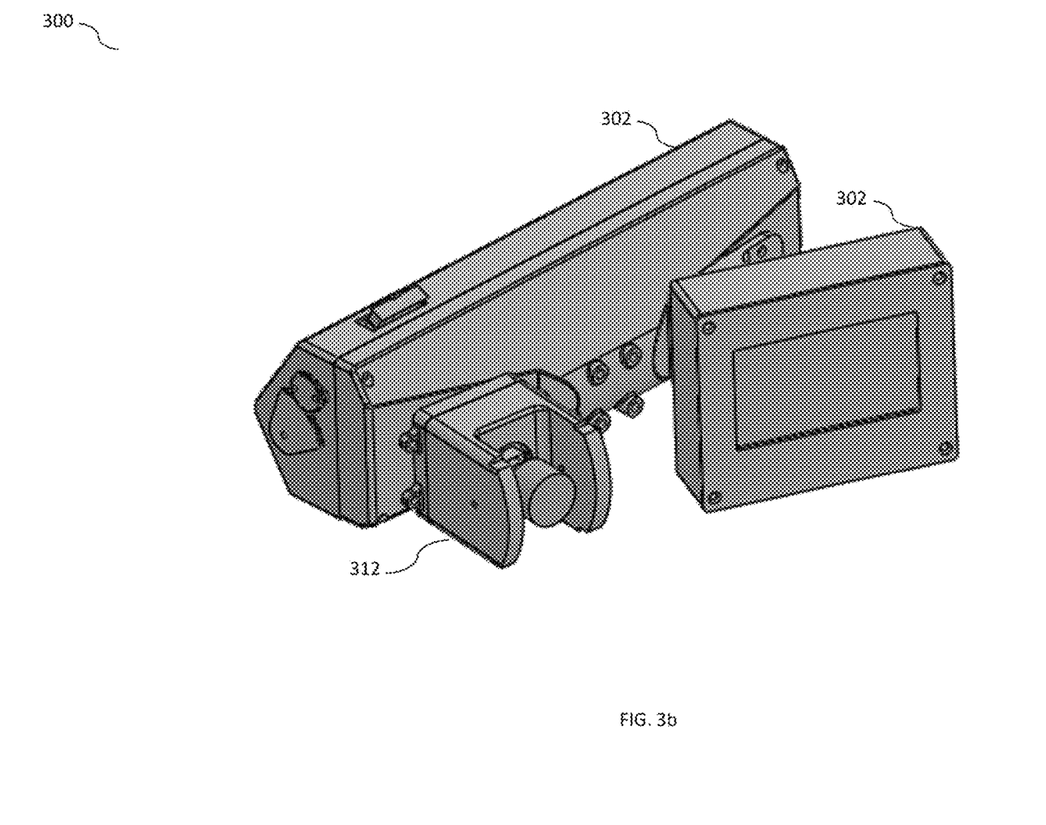
FIG. 3b is a line diagram illustrating rear view of an advanced driver assistance system, in accordance with an embodiment of the invention.

Now referring to FIG. 3b, a line diagram illustrating rear view of the ADAS 300. As indicated above, the ADAS 300 includes the single housing unit 302. At the rear side of the ADAS 300 is attached a driver state monitoring (DSM) device 312. The DSM device 312 is adapted to monitor driver state. The driver state may include driver profiling like driver age, driver sex, driving behavior. Also, driver monitoring may include emotions like sad, happy, angry, drowsy, sleepy, tired, anxious etc. There is also attached a warning device 302 on rear-side of the ADAS 300. The warning device 302 can be either a display device for a visual warning, or can give an audio-visual warning, an audio warning alone or can be attached to the control unit 310 which in turn is connected to an electronic control unit (ECU) of the vehicle (not shown in figure) for a haptic warning provided to driver through the steering. The DSM module 312 also captures reaction of the driver to feedback given in some situations and this information is stored in the memory 112.

Figure 4:
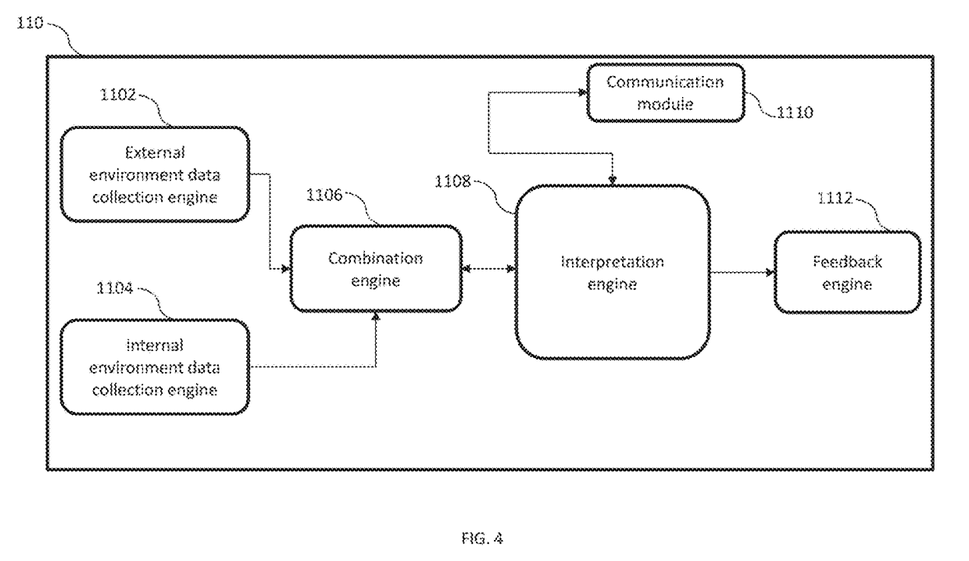
FIG. 4 is a block diagram illustrating a processor module, in accordance to an embodiment of the invention.

Now referring to FIG. 4 illustrating internals of the processor 110, in accordance with an embodiment of the invention. The processor 110 is either placed within the ADAS 300 or can be placed in the control unit 310. The processor 110 includes an external environment data collection engine 1102. This external environment data collection engine takes inputs from the first camera 102, the second camera 104, the ranging module 106 and combines the information to form external environment data. The processor 110 also includes an internal environment data collection engine 1104, that is adapted to take input from the third camera 108 that identifies driver state. Processor 110 further includes a combination engine 1106 that takes its input from the external environment data collection engine 1102 and the internal environment data collection engine 1104 and combines this information to form a current situation combination. The current situation combination is then sent to an interpretation engine 1108. The interpretation engine 1108 then determines whether it is a critical situation or not. Critical situation, to a person ordinarily skilled in the art would appreciate, will be a situation that requires feedback to the driver like, speed limit in approaching road is 45 mph however, driver is drowsy. Such a situation is a critical situation. Hence, the interpretation engine 1108 identifies such situation from the current situation combination. After fetching the critical situation from the current situation combination, the interpretation engine 1108 then initiates a communication module 1110 that connects with the memory 112 to fetch a historical situation combination similar to the current situation combination. If such a historical situation combination is identified, then the interpretation engine looks for feedback given and driver's reaction corresponding to the historical combination situation. Based on this historical driver's reaction feedback to current situation is decided (details of this will be explained in conjunction with FIG. 6 and FIG. 7) and this feedback information is then sent to feedback engine 1112 that gives the feedback to the driver.

Figure 5:
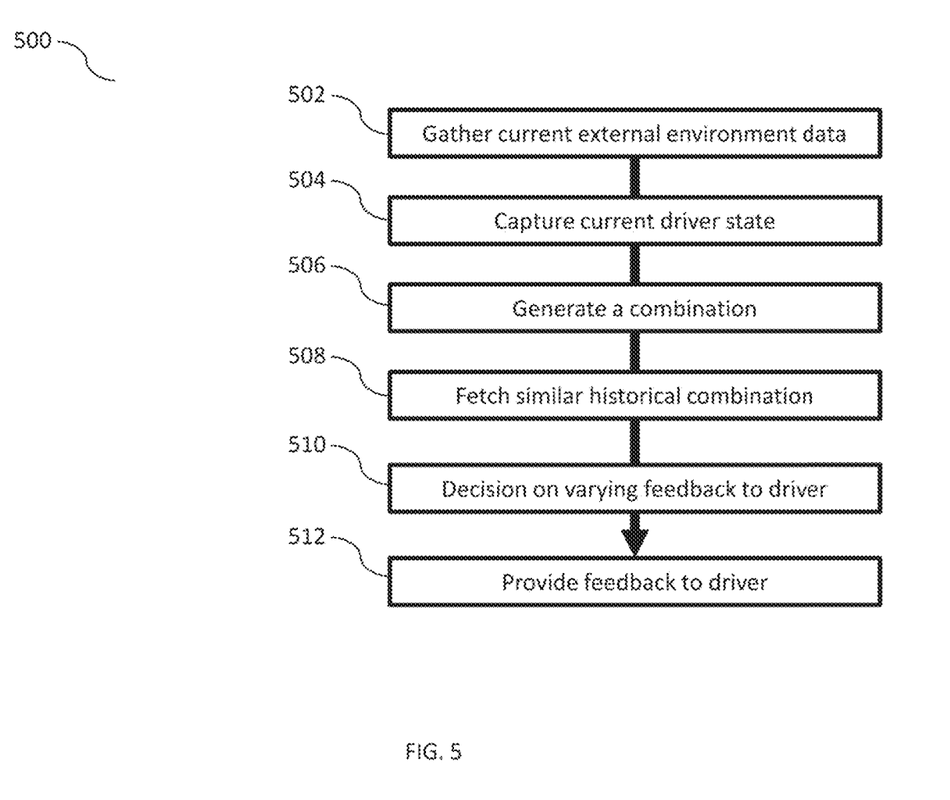
FIG. 5 is a flow chart illustrating a method of real-time driver assistance, in accordance to an embodiment of the invention.

Now referring to FIG. 5, a flow chart illustrating a method 500 for real-time driver assistance, in accordance to an embodiment of the invention. The method 500 analyzes current situation in and around the vehicle and the driver state and provides feedback to the driver by analyzing historically similar situation. The method 500 starts at step 502 at which current external environment data is gathered using the ADAS 300. The current external environment data, as already explained above, is collected using the first camera 304, the second camera 306 and the ranging module 308. Further, at step 504, driver's current state is captured. Now moving at step 506, a current combination situation is generated using the external environment and the driver current state. Further, at step 508, the ADAS 300 fetches from the memory 112, any similar historical combination situation. In case, the similar historical combination situation is available, the corresponding feedback and driver's reaction to the feedback is fetched and analyzed. At step 510, ADAS 300 determines whether degree of feedback to be given for the current critical situation is to be varied and to what degree (details will be explained with FIGS. 6 and 7). At step 512, feedback is provided to the driver. The feedback can be either audio, visual, audio-visual, or haptic.

Figure 6:
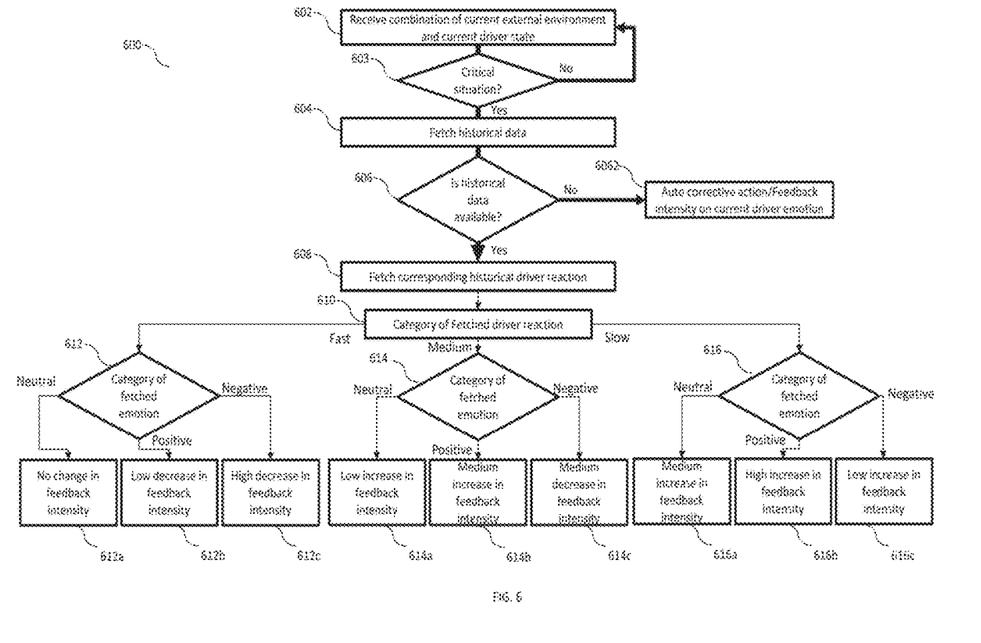
FIG. 6 is a flow chart illustrating a method of varying feedback, in accordance to an embodiment of the invention.

Now referring to FIG. 6, a flow chart illustrating a method 600 of varying feedback in real-time, in accordance to an embodiment of the invention. The method 600 is carried out within the interpretation engine 1108 of the processor 110. The method 600 starts at step 602, wherein the interpretation engine receives current combination situation that is a combination of current external environment and current driver state. At step 603, the interpretation engine 1108, identifies if it is a critical situation or not that has been described above in conjunction with FIG. 4. If the situation is not critical, the process is again started from step 602. However, in case the situation has been recognized as critical, the interpretation engine 1108, at step 604, fetches the historical data. This historical data is a similar historical combination situation to the current combination situation. The interpretation engine 1108, initiates the communication module 1110 to communicate with the memory 112. The memory 112 as described earlier, stores multiple historical combinations situations and the corresponding feedback and reaction of the driver to that feedback. Further, at step 606, it is determined, whether a similar historical combination situation is available in the memory or not. If no such historical combination situation is available, at step 6062, the ADAS 300 takes an auto corrective action that is takes appropriate action like assistive braking, switching lights on, etc. Or, the ADAS 300 provides a feedback that is of general intensity to the driver. ADAS 300 also, stores the reaction of the driver to such feedback and uses it for its own learning i.e. adaptive or self-learning. However, if the interpretation engine 1108, is able to find a similar historical combination situation, then at step 608, corresponding historical driver reaction is fetched. At step 610, the category of the fetched driver reaction is determined. If the reaction is fast, then at step 612 the category of corresponding fetched driver emotion is determined. The variation in the intensity of the feedback for current situation is based on matrix provided in table provided in FIG. 7. Here fast reaction is defined as timely taking the action that means there is practically very less time lag between the feedback provided and the reaction of the driver. Medium reaction time is defined as a delay of 10-15 seconds between the feedback provided and the driver reaction. Further, slow reaction time is defined as a delay more than 30 seconds in between the feedback time and the corresponding reaction.

Driver emotions are defined as positive, negative and neutral. Positive driver emotion means there is a little complacency in the driver. This could be due to confidence of the driver or his driving style. Neutral driver emotion is described as no emotion from the driver, that means the driver is OK with the kind of feedback provided. Negative emotion is defined as frightened or scared or anxious due to the feedback provided.

At step 612, if the category of the fetched driver emotion is neutral, then at step 612a there is no change that is made in the intensity of the feedback. In case, the driver emotion at step 612 is positive, then at step 612b there is a low degree decrease in feedback intensity so that driver is made more attentive for current and future situations. However, if the fetched emotion, at step 612 is negative then at step 612c a high degree decrease is made in the intensity of the feedback to be given to the driver in the current combination situation.

If the driver reaction determined at step 610 is medium, then at step 614, the category of fetched emotion is determined. In case the determined emotion is neutral, the feedback intensity for current situation is increased by a low degree at step 614a. This is since the reaction of the driver is medium and is delayed by a small time-frame. If the driver emotion fetched is positive, then at step 614b, the intensity of the feedback is increased by a medium degree. This is done so that driver is more attentive for current and future critical situations. However, in case the emotion fetched is negative, the feedback intensity is decreased by a medium degree in order to lower the harshness of the feedback, but, to keep the driver alert and attentive for the situations.

For the driver reaction determined to be neutral at step 610, the category of the fetched driver emotion is analyzed and feedback is varied according to that at step 616. If, fetched driver emotion, is neutral then there is a medium amount of increase in the feedback intensity for the driver at step 616a. This keeps the driver in check and attentive and serves the purpose of not startling the driver. In case, the driver emotion analyzed is positive, then at step 616b, there is a high increase in the intensity of the feedback. This is because, the driver reaction is slow and is complacent as well. Hence, to prepare him better for future critical situations, the increase in feedback intensity is required. Further, if the fetched driver reaction is negative, then at step 616c, the feedback intensity is still increased by a low degree since the reaction to the feedback is slow and the driver needs to be prepared well for the current and future critical situations.

Figure 7:
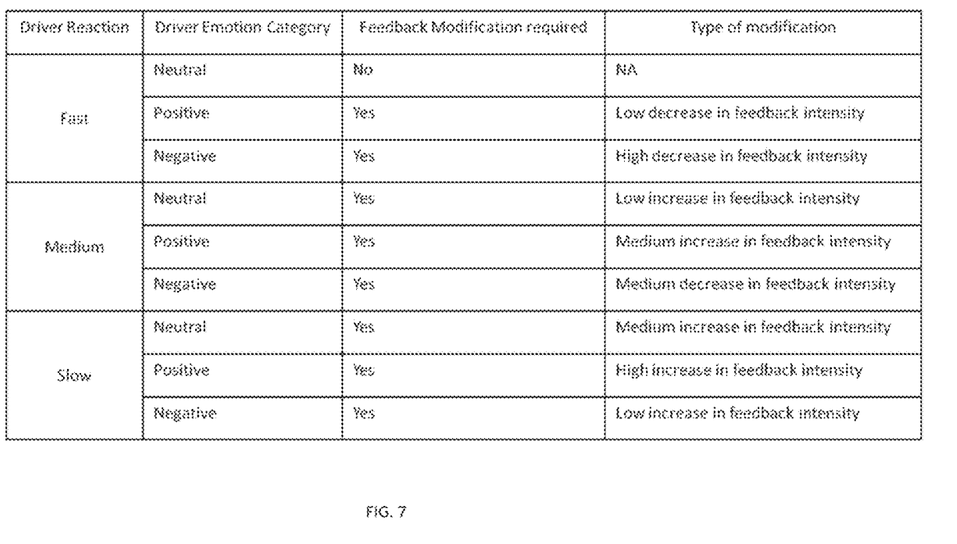
FIG. 7 is a table illustrating various driver reactions and decision based on driver reaction, in accordance to an embodiment of the invention.

In this manner, based on the matrix presented in table of FIG. 7 the feedback intensity for the driver for current combination situation is varied as per the historic combination situation and corresponding driver reaction to the historic combination situation.

Aspects of the present subject matter are described herein with reference to flowchart illustrations and/or block diagrams of methods and apparatus (systems) according to embodiments of the subject matter. It will be understood that each block of the flowchart illustrations and/or block diagrams, and combinations of blocks in the flowchart illustrations and/or block diagrams, can be implemented by computer readable program instructions.

While there has been shown, and described herein what are presently considered the preferred embodiments of the present disclosure, it will be apparent to those skilled in the art that various changes and modifications can be made therein without departing from the scope of the present disclosure as defined by the appended claims.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure. The accompanying claims and their equivalents are intended to cover such forms or modifications as would fall within the scope and spirit of the present disclosure.

What is claimed is:

1. An advanced driver assistance system mounted on a vehicle, wherein
   the system comprises;
   a forward looking first camera, adapted to identify activity and objects in short-range vicinity of the vehicle;
   a forward looking second camera, adapted to identify activity and objects in long-range vicinity of the vehicle;
   a ranging module, adapted to measure distance to objects in a straight path;
   a rear looking third camera, wherein the third camera is configured to gather driver's state, driver's profile and capture driver emotions;
   a storage, configured to store driver profile, driver emotions and corresponding reaction to various driving situations, wherein the driver profile includes at least one or a combination of a driver's age, driver's sex, and driving behavior;
   a processor, configured to;

gather a current external environment data from the first camera, and the second camera;

generate a current driver state information from the driver's state, and the driver's profile;

generate a current combination from the current external environment data and the current driver state information;

fetch a historically similar combination to the current combination from the storage;

categorize historical driver reaction corresponding to the historical combination and a corresponding warning provided during such historical combination;

categorize current driver emotion; and provide a warning to the driver for current combination, wherein the intensity of the warning is varied based on the historical driver reaction and the current driver emotion, wherein the intensity of the warning can be any one of a mild warning, a moderate warning and a severe warning; wherein the processor is further configured to combine the driver profile along with the historical reaction to the similar historical combination; wherein the historical driver reaction can be any one of a fast driver reaction, a medium driver reaction and a slow driver reaction;

wherein further if the historical driver reaction is the fast driver reaction and fetched driver emotion is a neutral then the feedback intensity for current situation is not changed; when the fetched driver emotion is a positive then the feedback intensity for current situation is increased by a low degree; when the fetched driver emotion is a negative then the feedback intensity for current situation is increased by a high degree;

wherein further if the historical driver reaction is the medium driver reaction and fetched driver emotion is neutral then the feedback intensity for current situation is increased by the low degree; when the driver emotion is positive then the feedback intensity for current situation is increased by a medium degree; when the driver emotion is negative then the feedback intensity for current situation is increased by the medium degree; and wherein further if the historical driver reaction is a slow driver reaction and fetched driver emotion is neutral then the feedback intensity for current situation is increased by the medium degree; when the driver emotion is positive then the feedback intensity for current situation is increased by the high degree; when the driver emotion is negative then the feedback intensity for current situation is increased by the medium degree.

2. The system of claim 1, wherein the first camera is a stereo camera having a short focal length.

3. The system of claim 1, wherein the second camera is a long range narrow field camera having a long focal length.

4. The system of claim 1, wherein the ranging module is a light detection and ranging (LiDAR) unit.

5. The system of claim 1, wherein the third camera is a charge coupled device camera.

6. The system of claim 1, wherein the third camera monitors driver state by capturing eye gaze and facial expressions of the driver.

7. The system of claim 1, wherein the historical reaction includes anyone or a combination of intensity of reaction, time to braking, or facial expressions during reaction.

8. The system of claim 1, wherein the warning is any one or a combination of an audio warning, a visual warning, or a haptic warning.

9. A real-time driver assistance method, comprising;

gathering current external environment information through a plurality of forward looking cameras connected to a processor;

capturing driver state, driver profile and driver emotions through at least one rear looking camera, connected to the processor, wherein the driver profile includes at least one or a combination of a driver's age, driver's sex, and driving behavior;

generating, by the processor a current driver state information generating, by the processor a current combination of the current external environment and the current driver state information;

fetching, by the processor, a historical combination similar to the current combination generated by the processor from a storage module, wherein the storage module is configured to store a plurality of historical combinations of external environment and corresponding driver state information and a corresponding driver reaction to a warning offered to the driver for a particular combination of external environment and driver state during the particular combination;

categorizing, by the processor, historical driver reaction corresponding to the historical combination;

categorizing, by the processor, current driver emotion, and varying, by the processor, intensity of a warning to be provided to the driver wherein the variation is based on the similar historical driver reaction and the current driver emotion, wherein the intensity of the warning can be any one of a mild warning, a moderate warning and a severe warning; wherein further the processor also combines the driver profile along with the historical reaction to the similar historical combination, wherein the historical driver reaction can be any one of a fast driver reaction, a medium driver reaction and a slow driver reaction;

wherein further if the historical driver reaction is the fast driver reaction and fetched driver emotion is a neutral then the feedback intensity for current situation is not changed; when the fetched driver emotion is a positive then the feedback intensity for current situation is increased by a low degree; when the fetched driver emotion is a negative then the feedback intensity for current situation is increased by a high degree;

wherein further if the historical driver reaction is the medium driver reaction and fetched driver emotion is neutral then the feedback intensity for current situation is increased by the low degree; when the driver emotion is positive then the feedback intensity for current situation is increased by a medium degree; when the driver emotion is negative then the feedback intensity for current situation is increased by the medium degree; and wherein further if the historical driver reaction is a slow driver reaction and fetched driver emotion is neutral then the feedback intensity for current situation is increased by the medium degree; when the driver emotion is positive then the feedback intensity for current situation is increased by the high degree;

when the driver emotion is negative then the feedback intensity for current situation is increased by the medium degree.

10. The real-time driver assistance method of claim 9, wherein the plurality of forward looking cameras include anyone or a combination of a stereo camera, or a long range narrow field camera.

11. The real-time driver assistance method of claim 10, wherein profile of the driver is stored in the external environment captured using the at least one rear looking camera.

* * * * *